United States Patent [19]

Ellerton et al.

[11] 3,725,399
[45] Apr. 3, 1973

[54] METHOD OF PRODUCING 7β-ACYLAMIDO-3-METHYLCEPH-3-EM-4-CARBOXYLIC ACID ESTERS

[75] Inventors: Norman V. Ellerton, Harrow; William F. Paradise, Windsor; Peter E. Sandford, Chalfont St. Peter, all of England

[73] Assignee: Glaxo Laboratories Limited, Greenford, Middlesex, England

[22] Filed: Mar. 10, 1970

[21] Appl. No.: 18,283

[30] Foreign Application Priority Data

Mar. 11, 1969  Great Britain.....................12,866/69
Sept. 22, 1969  Great Britain.....................46,622/69

[52] U.S. Cl...............................260/243 C, 424/246

[51] Int. Cl..............................................C07d 99/24
[58] Field of Search...................................260/243 C

[56] References Cited

UNITED STATES PATENTS 3,275,626  9/1966  Morin et al......................260/243 C

*Primary Examiner*—Nicholas S. Rizzo
*Attorney*—Bacon & Thomas

[57] ABSTRACT

The invention relates to a process for the preparation of 7β-acylamido-3-methylceph-3-em-4-carboxylic acid esters from 6β-acylamido penicillanic acid 1-oxide esters in the presence of catalysts which are salts or complexes of acids with nitrogen bases having a pKb of not less than 4. The salts or complexes may be formed in situ.

18 Claims, No Drawings

METHOD OF PRODUCING 7β-ACYLAMIDO-3-METHYLCEPH-3-EM-4-CARBOXYLIC ACID ESTERS

This invention is concerned with an improved process for obtaining cephalosporin compounds. In particular the invention is concerned with the conversion of penicillin type compounds into cephalosporin type compounds.

The compounds referred to in this specification are generally named with reference to penicillanic acid and cepham. Penicillanic acid has the structure:

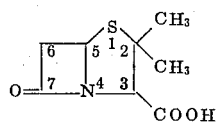   I and cepham has the structure:

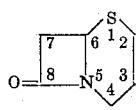   II (see J.A.C.S. 1962, 84, 3400 and J.Chem. Soc. 1965, 5031). The term "cephem" refers to the basic cepham structure with a single olefinic double bond.

Cephalosporin antibiotics are of great interest in that a number of them are of value in the treatment of infections caused by pathogenic bacteria some of which are resistant to other antibiotics. Penicillin compounds are, currently, produced in greater quantities on an industrial scale than are cephalosporin compounds and with the continually increasing interest in cephalosporin compounds it is highly desirable to have available alternative techniques for producing the latter such as a simple process for converting compounds of the penicillin type into cephalosporins.

The invention is thus principally concerned with the conversion of 6β-acylamidopenicillanic acid 1-oxide esters into 7β-acylamido-3-methylceph-3-em-4-carboxylic acid esters.

In U.S. Pat No. 3,275,626 there is described a general method for preparing antibiotic substances, including cephalosporins, which comprises heating a so-called penicillin sulphoxide, under acid conditions, to a temperature of from about 100° to about 175° C.

It is an object of the invention to provide a novel process for the rearrangement of penicillin compounds to cephalosporin compounds. We have found that the rearrangement can be effected in good yields by means of certain substances which exist as salts or complexes.

In many instances the process can be effected with ease and economy of operation. It is not certain in each instance whether they are true salts or complexes. For example, reaction of pyridine with orthophosphoric acid yields a crystalline material analyzing $C_5H_5N \cdot 2H_3PO_4$. For convenience we have described them as being salts although it should be understood that the term "salts" is interchangeable with "complexes." Moreover, under the conditions of the reaction the salt or complex may exist in a dissociated form.

According to an embodiment of the present invention therefore there is provided a process for the preparation of 7β-acylamido-3-methylceph-3-em-4-carboxylic acid esters comprising rearranging a 6β-acylamidopenicillanic acid 1-oxide ester (referred to herein as the penicillin oxide) in a substantially inert organic solvent in the presence of a salt of a nitrogen base having a pKb of not less than 4 and an acid, which salt may be formed in situ in the reaction mixture. The acid may be, for example, an organic sulphonic acid, a phosphorus acid or trifluoroacetic acid.

The organic sulphonic acid may be for example, a hydrocarbyl (e.g., alkyl, aralkyl or aryl) sulphonic acid (e.g., methane sulphonic acid, toluene-p-sulphonic acid, p-xylene sulphonic acid or naphthalene 2-sulphonic acid), or a pyridylsulphonic acid.

The phosphorus acid may be orthophosphoric, polyphosphoric, pyrophosphoric or phosphorous acid or it may be a phosphonic acid. The phosphonic acid may be an aliphatic, araliphatic or aryl phosphonic acid; the aliphatic, araliphatic or aryl group of such a phosphonic acid may be a hydrocarbon group (e.g., a lower alkyl, phenyl lower alkyl or phenyl group) or a hydrocarbon group substituted by, for example, a halogen atom or a nitro group. Examples of aliphatic phosphonic acids include the lower alkyl and substituted (e.g., halogeno) lower alkyl phosphonic acids such as methane phosphonic acid, ethane phosphonic acid, dichloromethane phosphonic acid, trichloromethane phosphonic acid and iodomethane phosphonic acid. Examples of aryl phosphonic acids include the benzene and substituted (e.g., halogeno or nitro) benzene phosphonic acids e.g., bromobenzene phosphonic acids and nitro-benzenephosphonic acids.

The nitrogen base may be either inorganic or organic. The expression "nitrogen base" is used herein as a convenient expression for a basic substance containing nitrogen although it may include other hetero atoms e.g., oxygen. We prefer however to use organic amines. Bases which may be used have a pKb for protonation of not less than 4 (i.e., as measured in water at 25° C). The base may be a polyfunctional base having a nitrogen function with such a pKb for the first protonation step. The bases preferably have a pKb in water of not less than 7.

The organic base may be primary, secondary or tertiary; however, we prefer to employ weak tertiary organic bases. Illustrative of such tertiary organic bases are the unsaturated heterocyclic bases such as pyridine, quinoline, isoquinoline, benzimidazole and homologues thereof, for example the lower alkyl substituted pyridines and quinolines such as α-, β- and γ-picolines and 2- and 4-methylquinolines. Other substituted heterocyclic bases which may be used include those substituted by halogen (e.g., chlorine or bromine), acyl (e.g., formyl or acetyl), acylamido (e.g., acetamido), cyano, carboxy, aldoximino and the like.

Other organic bases which may be used include aniline and nuclear substituted anilines such as halogeno anilines (e.g., o-chloroaniline, m-chloroaniline and p-chloroaniline); lower alkyl anilines (e.g., o-methylaniline and m-methylaniline); hydroxy- and lower alkoxyanilines (e.g., o-methoxyaniline and m-hydroxyaniline); nitroanilines (e.g., m-nitroaniline) and carboxyanilines (e.g., m-carboxyaniline) as well as N-lower alkyl anilines (e.g., N-methylaniline).

Preferred classes of salts of nitrogen bases are those obtained by the reaction of a phosphorus acid or a sulphonic acid with a nitrogen base, e.g., in substantially molar equivalents. Advantageous results have been obtained in the process according to the invention when salts of orthophosphoric or a phosphonic acid are employed as catalyst. Examples of phosphonic acids are the aliphatic and aryl phosphonic acids described above.

Another preferred class of salts is that obtained by reacting substantially molar equivalents of an acid with an aromatic heterocyclic tertiary organic nitrogen base. Advantageous results have been obtained in the process according to the invention when salts of pyridine, quinoline, isoquinoline or derivatives thereof substituted with lower alkyl, halogen, acyl, acylamido, cyano, carboxy, or aldoximino, are employed as catalyst.

Particularly preferred salts of nitrogen bases are those obtained by reaction of a phosphorus acid with an aromatic heterocyclic, tertiary organic nitrogen base, particularly in substantially molar equivalents Advantageous results have been obtained in the process according to the invention when salts of orthophosphoric or a phosphonic acid with pyridine, quinoline, isoquinoline, or such bases substituted by, for example, lower alkyl, halogen, acyl, acylamido, cyano, carboxy, or aldoximino are employed. Thus useful catalysts include pyridine; 2-methyl- and 4-methyl-pyridine; quinoline and isoquinoline salts of orthophosphoric, methane phosphonic, ethane phosphonic, iodomethane phosphonic, dichloromethane phosphonic, trichloromethane phosphonic, bromobenzene phosphonic and nitrobenzene phosphonic acids.

The salts for use in the process according to the invention may be derived from proportions of the acid and the base such that one or more of the acidic function(s) is exactly neutralized by the base. Generally, we prefer to use molar equivalents of the base and the acid. If desired, however, molar proportion other than those specified above may be used, for example, a less than molar quantity of nitrogen base may be employed so that, in addition to the salt the catalyst also comprises some free acid. Alternatively, a more than molar quantity of nitrogen base may be employed to produce a salt the average composition of which corresponds to a material intermediate to a mono- or di- (nitrogen base) salt. The base may be used in excess of the total molar requirement to neutralize the acid function(s) but should not be used in large excess e.g., it should generally not be used in amounts of 5 molar excess and greater and consequently this precludes the use of bases as solvents for the reaction.

The optimal ratio of acid: base will depend on various factors including the nature of the acid and the base as well as the nature of the penicillin oxide. The optimal ratio may be ascertained by preliminary trial and experiment.

One preferred salt for use in the process according to the invention is that obtained in situ in the reaction mixture by the reaction of substantially molar equivalents of pyridine and orthophosphoric acid.

Other preferred salts for use in the process according to the invention are formed from pyridine and dichloromethane phosphonic acid. One is obtained by reaction of substantially molar equivalents of pyridine and dichloromethane phosphonic acid and is referred to herein as monopyridinium dichloromethanephosphonate and another is obtained by reacting substantially 2 moles of pyridine with 1 mole of the phosphonic acid and is referred to herein as dipyridinium dichloromethane phosphonate.

Salts formed from a nitrogen base having a pKb of not less than 4 and a phosphonic acid are novel compounds and constitute a further feature of the invention. The phosphonic acid is preferably a lower alkane or halogeno lower alkane phosphonic acid. Novel compounds thus include pyridinium trichloromethane phosphonate, N-methylanilinium trichloromethane phosphonate, bis(benzylammonium) trichloromethane phosphonate, α-picolinium trichlormethane phosphonate, pyridinium o-bromo-benzene phosphonate, monopyridinium dichloromethane phosphonate, monoisoquinolinium dichloromethane phosphonate and mono-3-methylisoquinolinium dichloromethane phosphonate.

Monopyridinium dichloromethane phosphonate may, conveniently, be prepared by gradually adding pyridine to a solution of dichloromethane phosphonic acid in a polar solvent (e.g., a ketone such as acetone or a lower alkanol such as methanol, ethanol, n-propanol or iso-propanol). Monopyridinium dichloromethanephosphonate is a stable, white crystalline solid melting at 142–5° C.

Other preferred salts are disclosed in the examples described below.

The process according to the invention is carried out in organic solvent since one may regulate more exactly reaction conditions such as temperature. Ordinarily, the penicillin oxide will be in solution in the organic solvent. The solvent should be substantially inert to the penicillin oxide used in the process and to the cephalosporin produced by the process.

Solvents which may be used include those described in U.S. Pat. No. 3,275,626 and other publications describing the rearrangement reaction. However, particularly suitable solvents include ketones boiling at from 75°–120° C (e.g., 100°–120° C), esters boiling at from 75°–140° C (e.g., 100°–130° C), dioxan and diethylene glycol dimethyl ether (diglyme). Illustrative of those ketones and esters that may be used in the process according to the invention are aliphatic ketones and esters having appropriate boiling points including ethyl methyl ketone, isobutyl methyl ketone, methyl n-propyl ketone, n-propyl acetate, n-butyl acetate, iso-butyl acetate, sec-butyl acetate and diethyl carbonate.

The time for achieving optimum yields by the process according to the invention varies according to the particular solvent employed. The rearrangements are conveniently carried out at the boiling point of the chosen solvent and, for those solvents boiling in the lower part of the ranges quoted above, correspondingly longer reaction times, e.g., up to 48 hours, may be required than for those solvents boiling at higher temperatures. Rearrangements in dioxan generally require times of 7–15 hours to achieve optimum results whereas those carried out in methyl isobutyl ketone generally require times of 1–8 hours. The yields in the rearrangements are dependent, but to a lesser extent, on the concentration of the catalyst in the solvent, correspondingly longer reaction times being required for lower concentrations of catalyst.

We particularly prefer to use dioxan as the organic solvent. Penicillin oxides can be dissolved in this solvent in high concentration and in general there is no falling off of yield with increase of concentration up to concentrations of the order of 35 percent.

The quantity of the salt used should not generally exceed 1.0 mole per mole of the penicillin oxide; however, we generally prefer to use salts in proportions of from 0.01 to 0.2 mole per mole of penicillin oxide.

The salts used in the process according to the invention produce comparatively little color during the rearrangement as compared with similar rearrangements carried out in the presence of an acid catalyst such as a hydrocarbyl sulphonic acid. Byproducts commonly formed with such acid catalysts appear to only a much smaller extent and the use of salts has the practical advantage that, under our preferred conditions, it is unnecessary to use decolorizing agents and acid binding agents before removing the reaction solvent.

The appropriate time interval for any particular reaction may be determined by testing the reaction solution by one or more of the following procedures:
1. Thin layer chromatography, for example on silica gel, developing with a 2:1 mixture of benzene and ethyl acetate and rendering the spots visible by treatment with an iodine/azide solution Russell, Nature, 1960, 186, 788). Where, for example, the starting material is the 2,2,2-trichloroethyl ester of 6$\beta$-phenylacetamidopenicillanic acid 1$\beta$-oxide, the product ($R_F$ 0.65) gives an orange/brown color whereas the starting material ($R_F$ 0.5) gives a dark yellow color.
2. Determination of the rotation after suitable dilution of the reaction mixture with for example, chloroform. Using the same starting material as in (1) the rotation drops to between about a third to about a quarter of the initial value.
3. Determination of the ultraviolet spectrum of a sample of the reaction mixture suitably diluted wit ethyl alcohol. Using the same starting material as in (1) the calculated value for $E_{1cm.}^{1\%}$ at 264 nm rises to about 100 for a successful reaction. Absorption maxima at higher wave-lengths are preferably low or absent. This determination cannot be adapted when ketonic solvents are used as the reaction media.

Although satisfactory yields can be obtained by carrying out the reaction under normal reflux, it may be possible to improve the yields by inserting a desiccating agent (e.g., alumina, calcium oxide, sodium hydroxide or molecular sieves) which is inert to the solvent in the reflux return line to remove water formed during the reaction. Alternatively the water formed during the reaction may be removed by the use of a fractionating column the water formed being removed by fractional distillation.

After completion of the reaction the salt may be removed either before or after concentrating the reaction mixture. If the reaction solvent is immiscible with water, the salt can be removed by a simple washing procedure. On the other hand, if the reaction medium is miscible with water a convenient purification technique is to remove the reaction solvent (this may be achieved by distillation under reduced pressure) and then to purify the residue by any convenient process e.g., chromatography on silica gel.

It has been found that the degree of conversion achieved by the process according to the invention may be such that complicated purification procedures can be dispensed with and the product isolated in a substantially pure condition after a simple crystallization process.

Preferably, however, the product is isolated by pouring the reaction mixture into water, filtering off the product and, if desired, further purifying by recrystallization from, or slurrying with, a suitable solvent.

When using preferred catalysts, for example, pyridinium phosphate or mono-pyridinium dichloromethane phosphonate in dioxan solution, it may be necessary only to evaporate off the solvent and to crystallize the product from a suitable solvent in order to obtain a high yield of substantially pure product.

A color removal step e.g., by means of charcoal may be employed; however this is not normally necessary in the preferred conditions of the process according to the invention.

The penicillin oxide used as starting material in the process according to the invention may be derived from a salt of 6$\beta$-phenylacetamidopenicillanic acid or of 6$\beta$-phenoxyacetamidopenicillanic acid, obtained for example from a fermentation process, by esterification of the carboxyl group at the 3-position of the penicillanic acid and oxidation of the sulphur atom at the 1-position. Alternatively the penicillin oxide may be obtained from 6$\beta$-aminopenicillanic acid by acylation of the amino group at the 6$\beta$-position, esterification of the carboxyl group at the 3-position, and oxidation of the sulphur at the 1-position.

The oxidation may be carried out as described by Chow, Hall and Hoover (J. Org. Chem. 1962, 27, 1381). The penicillin compound is mixed with the oxidizing agent in an amount such that at least one atom of active oxygen is present per atom of thiazolidine sulphur. Suitable oxidizing agents include metaperiodic acid, peracetic acid, monoperphthalic acid, m-chloroperbenzoic acid and t-butyl hypochlorite, the latter being preferably used in admixture with a weak base, e.g., pyridine. Excess oxidizing agents may lead to the formation of 1,1-dioxide. The 1-oxide may be obtained in the $\alpha$- and/or $\beta$-form.

Acyl groups at the 6$\beta$-amino position of the penicillin oxide may be any desired acyl group but should preferably be reasonably stable under the conditions of the rearrangement. Conveniently the acyl group at the 6$\beta$-position is that of a penicillin obtained by a fermentation process e.g., phenylacetyl or phenoxyacetyl. Such a group may not be the desired group in the cephalosporin end-product but this can be obviated by subsequent transformations described below. Another acyl group which may conveniently be used is the formyl group.

Alternatively, the acyl group at the 6$\beta$-position of the penicillin oxide may be that desired in the cephalosporin compound, e.g., a thienylacetyl or phenylglyoxylyl group, or it may be a precursor for the desired acyl group e.g., an acyl group containing a protected functional group such as a protected amino group. An example of such an acyl group is a protected $\alpha$-aminophenylacetyl group.

The amine protecting group is conveniently one which can subsequently be removed by reduction or hydrolysis without affecting the rest of the molecule, especially the lactam and 7$\beta$-amido linkages of the resulting cephalosporin compound. A similar protecting group may also be used as the esterifying group at the 3-COOH position and both groups can be simultaneously removed as described below. An advantageous procedure is to remove both groups at the last stage in the sequence. Protected groups include urethane, arylmethyl (e.g., trityl)-amino, arylmethyleneamino, sulphenylamino and enamine types. Such groups can in general be removed by one or more reagents selected from dilute mineral acids, e.g., dilute hydrochloric acid, concentrated organic acids, e.g., concentrated acetic acid, trifluoroacetic acid, and liquid hydrogen bromide at very low temperatures, e.g., $-80°$ C. A convenient protecting group is the tertiary butoxycarbonyl group, which is readily removed by hydrolysis with dilute mineral acid, e.g., dilute hydrochloric acid, or preferably with a strong organic acid, (e.g., formic acid or trifluoroacetic acid), e.g., at a temperature of $0°-40°$ C., preferably at room temperature ($15° - 25°$ C). Another convenient protecting group is the 2,2,2-trichloroethoxycarbonyl group which may be split off by an agent such as zinc in acetic acid, formic acid, lower alcohols or pyridine.

The ester of the penicillanic acid is preferably formed with an alcohol or phenol which may readily be split off, e.g., by hydrolysis or reduction, at a later stage to yield the subsequently formed ceph-3-em compound as the free acid. Alcohol and phenol residues which may readily be split off include those containing electron-attracting substituents for example sulpho groups and esterified carboxyl groups, these groups may be subsequently split off by alkaline reagents. Benzyl and o-benzyl-oxyphenoxy ester groups may be removed by hydrogenolysis although this may involve catalyst poisoning. A preferred method of removal involves acid cleavage and groups which may be removed by acid cleavage include adamantyl, t-butyl, benzyl residues such as anisyl and the residues of alkanols containing electron donors in the $\alpha$-position such as acyloxy, alkoxy, benzoyloxy, substituted benzoyloxy halogen, alkylthio, phenyl, alkoxyphenyl or aromatic heterocyclic. These radicals may be derived from benzyl alcohols such as p-methoxybenzyl alcohol, di-p-methoxyphenylmethanol, triphenylmethanol, diphenylmethanol, benzoyloxymethanol, benzoylmethanol, p-nitrobenzyl alcohol and furfuryl alcohol.

Alcohol residues which may be readily split off subsequently by a reducing agent are those of a 2,2,2-trihalogenoethanol, e.g., 2,2,2-trichloroethanol, p-nitrobenzyl alcohol or 4-pyridylmethanol. 2,2,2-Trihalogenoethyl groups may conveniently be removed by zinc/acetic acid zinc/formic acid, zinc/lower alcohol or zinc/pyridine or by chromous reagents; p-nitrobenzyl groups may conveniently be removed by hyrogenolysis and 4-pyridylmethyl groups may conveniently be removed by electrolytic reduction.

Where the ester group is subsequently removed by an acid catalyzed reaction, this may be effected by using formic acid or trifluoroacetic acid (preferably in conjunction with anisole) or alternatively by using hydrochloric acid e.g., in admixture with acetic acid.

We particularly prefer to use those penicillin oxides having a diphenylmethoxycarbonyl, a 2,2,2-trichloroethoxycarbonyl, a t-butoxycarbonyl, a p-nitrobenzyloxycarbonyl, benzoylmethoxycarbonyl or p-methoxybenzyloxycarbonyl group at the 3-position in the process according to the invention because the ceph-3-em compounds formed from esters of this type do not appear to undergo appreciable $\Delta^3$ $\Delta^2$ isomerization in the desterification reaction.

Where the product of the rearrangement is a $7\beta$-acylamidoceph-3-em compound not having the desired acyl group, the $7\beta$-acylamido compound may be N-deacylated, if desired after reactions elsewhere in the molecule, to yield the corresponding $7\beta$-amino compound and the latter acylated with an appropriate acylating reagent.

Methods of N-deacylating cephalosporin derivatives having $7\beta$-acylamido groups are known ane one suitable method comprises treating a $7\beta$-acylamidoceph-3-em-4-carboxylic acid ester with an imide-halide forming component, converting the imide halide so obtained into the imino ether and decomposing the latter. If desired, the ester group may be split off by hydrolysis or hydrogenolysis to yield the 4-carboxylic acid. Suitable readily removable ester groups are described above.

Suitable imide halide forming components include acid halides derived from the phosphorus acids, the preferred compounds being the chlorides such as, for example, phosphorus oxychloride or phosphorus pentachloride.

This method of N-deacylation is described in greater detail in Belgian Pat. No. 719,712. N-Deformylation of a $7\beta$-formamido group may be effected with a mineral acid at a temperature of minus $15°$ to $100°$ C, preferably $+15°$ to $40°$ C. A convenient reagent for the N-deformylation is concentrated hydrochloric acid in methanol or, preferably, in dioxan or tetrahydrofuran since undesirable transesterification reactions that tend to occur in methanol are thereby avoided.

In order that the invention may be well understood the following Examples are given by way of illustration only.

In the Examples, unless otherwise stated, thin layer chromatography (TLC) was carried out on silica gel using a mixture of benzene and ethyl acetate (2:1) as the developing solvent and detecting the spots with iodine/azide solution.

EXAMPLE 1

2,2,2-Trichloroethyl $6\beta$-phenylacetamidopenicillanate $1\beta$-oxide (19.28g., 40 mmole.) was dissolved in warm dioxan (400 ml). Pyridinium phosphate ($C_5H_5N\cdot 2H_3PO_4$; 0.0704g., 2.56 mmole.) was added and the solution was heated under reflux for 16 hours in an apparatus designed so that the condensed solvent passed through calcium oxide (6–12 mesh ca 40 g.) before returning to the reaction vessel.

The cooled mixture was evaporated under reduced pressure to give a gum which was treated with warm ethyl alcohol [industrial methylated spirits (IMS); 20 ml.]. A solid crystallized, and the mixture was refrigerated for 3 hours and filtered. The collected solid was washed with IMS (10 ml.) and diethyl ether (20 ml.) and dried to give 2,2,2-trichloroethyl 3-methyl-$7\beta$-phenylacetamidoceph-3-em-4-carboxylate (12.4g., 66.9 percent of theory) $[\alpha]_D + 51.9°$ (C, 1.0 in $CHCl_3$); mp 162–4°.

A second crop (1.65g; 8.9 percent of theory) was obtained from the liquors $[\alpha]_D + 52.6°$ (C, 1.0 in $CHCl_3$); mp 160–1°.

EXAMPLE 2

A mixture of 2,2,2-trichloroethyl 6β-phenylacetamidopenicillanate 1β-oxide (4.82g. 10 mmole), pyridine (0.078g., 1 mmole.), orthophosphoric acid (specific gravity 1.75; 0.112g. 1 mmole.) and isobutyl-methyl ketone (200 ml.) was boiled under reflux for 3 hr. The solution was cooled and then washed with water (1 × 100 ml., 1 × 50 ml.). The organic phase was evaporated, under reduced pressure and the resultant gum was dissolved in ethyl alcohol (I.M.S.; 20 ml.)

The solution was evaporated to dryness and the solid residue was triturated with ethyl alcohol (I.M.S.; 15 ml.). The suspension was stored for 16 hr at 0° C and filtered. The collected solid was washed with ether and dried to yield 2,2,2-trichloroethyl 3-methyl-7β-phenylacetamidoceph-3-em-4-carboxylate (3.20g., 69.0 percent of theory), mp. 161-2°, $[\alpha]_D^{20} + 52.1°$ (C, 1.0 in $CHCl_3$).

EXAMPLE 3

2,2,2-Trichloroethyl 6β-phenylacetamidopenicillanate 1 62 -oxide (4.82g., 10 mmole.) and pyridinium methane sulphonate (0.175g., 1 mmole.) were dissolved in hot isobutyl methyl ketone (200 ml.) and heated under reflux for 1½ hours. The solution was cooled and washed with water (1 × 50 ml. and 1 × 25 ml.) before evaporating to dryness under reduced pressure. The residual semicrystalline gum was triturated with ethyl alcohol (I.M.S. 20 ml.) and refrigerated for 4 hours. A solid was collected by filtration, washed with ethyl ether (20 ml.) and dried in vacuo to give 2,2,2-trichloroethyl 3-methyl-7β-phenylacetamidoceph-3-em-4-carboxylate (2.79g., 60.1 percent theory), mp 160°-161°, $[\alpha]_D + 55.5°$ ($CHCl_3$ C = 1.0).

A second crop (0.1g., 2.2 percent theory mp 160°) was obtained from the liquors.

EXAMPLE 4

Pyridine (0.04 ml; 0.05 mole equivalent) and 88 percent w/v orthophosphoric acid (0.032 ml; 0.05 mole equivalent) were added to n-propyl propionate and the mixture boiled under reflux with the condensate returned to the reaction flask via a column of calcium oxide (10g.). After ca 15 minutes reflux the mixture was cooled slightly and 2,2,2-trichloroethyl 6β-phenylacetamidopenicillanate 1β-oxide (4.82g; 0.01 mole) added. The mixture was refluxed for 2 hours, concentrated to a low bulk and the residue crystallized from ethanol (12 ml.) to give 2,2,2-trichloroethyl 3-methyl-7β-phenylacetamidoceph-3-em-4-carboxylate, 3.04g (65.5 percent of theory) m.p. 161°-162° $[\alpha]_D^{22} + 52.2°$ (C, 0.8 in $CHCl_3$), $\lambda_{max}$ (ethanol) at 264 nm ($E_{1cm}^{1\%}$ 130).

EXAMPLE 5 p-Methoxybenzyl 3-methyl-7β-phenylacetamidoceph-3-em-4-carboxylate was prepared by rearrangement of p-methoxybenzyl 6β-phenylacetamidopenicillanate 1β-oxide.

The starting material may be prepared by one of methods (i), (ii) or (iii) below.

METHOD (i) p-Methoxybenzyl bromide (15.93 g., 79.2 mmole) was added to a stirred solution of 6β-phenylacetamidopenicillanic acid 1β-oxide (25.1 g., 72 mmole.) and triethylamine (10.08 ml 72 mmole.) in dry N,N-dimethylformamide (200 ml.). The mixture was stirred at room temperature for 16 hours, and poured into ice-cold water (1,000 ml.) to precipitate a pale yellow oil. This was extracted into ethyl acetate (3 × 100 ml.), and the combined organic extract was washed with 3 percent-aqueous sodium hydrogen carbonate solution (250 ml.) and water (3 × 200 ml.), dried over anhydrous magnesium sulphate, and evaporated to give a pale yellow foam. The foam was dissolved in ethyl acetate (200 ml.) and any residual N,N-dimethylformamide removed by washing with water (2 × 250 ml.). Some crystalline solid separated during the second washing; this was redissolved on dilution with more ethyl acetate. The ethyl acetate phase was filtered through anhydrous magnesium sulphate and evaporated in vacuo to ca. 20 ml., when a crystalline solid had separated. This solid was filtered off, washed with ether (50 ml.) and dried to give p-methoxybenzyl 6β-phenylacetamidopenicillanate 1β-oxide (26.55 g., 78 percent), m.p. 149.5°-150.5°, $[\alpha]_D^{20} +206°$ (c, 0.95; $CHCl_3$), $\nu_{max}$ ($CHBr_3$) 1,788 (β-lactam) and 1,740 $cm^{-1}$ ($CO_2R$). (Found: C, 61.3; H, 5.7; N, 5.8; S, 6.9. $C_{24}H_{26}N_2O_6S$ (470.5) requires C, 61.25; H, 5.6; N, 5.95; S, 6.8 percent).

METHOD (ii)

Ethyl chloroformate (3.9 ml., 40 mmole) and dry triethylamine (2.8 ml., 20 mmole) were added to a stirred suspension of N-ethylpiperidinium 6β-phenylacetamidopenicillanate (17.9g., 40 mmole) in dry methylene dichloride (200 ml.) previously cooled to 0°. The pale yellow solution was stirred at 0° for 30 minutes when p-methoxybenzyl alcohol (16.58 g., 120 mmole) was added. The reaction mixture was allowed to warm to room temperature over half an hour and then stirred at this temperature for a further 2.5 hours, washed successively with 5 percent orthophosphoric acid (150 ml.), pH 7.3 0.2M-phosphate buffer (150 ml.), water (150 ml.), and then evaporated to give p-methoxybenzyl 6β-phenylacetamidopenicillanate as a yellow syrup, t.l.c. (benzene-ethylacetate = 2:1) $R_f$ 0.48, 0.65 (p-methoxybenzyl alcohol $R_f$ 0.49).

The syrup was dissolved in dry methylene dichloride (50 ml.) and a 1.8M-solution of monoperphthalic acid in ether (20 ml.) was added; phthalic acid began to precipitate immediately. The suspension was stirred at room temperature for 1 hour and then washed with saturated aqueous sodium hydrogen carbonate solution (4 × 50 ml.). The combined aqueous layer was back-washed with methylene dichloride (50 ml.), and these washings were combined with the organic phase, which was washed successively with saturated aqueous sodium hydrogen carbonate solution (50 ml.) and water (2 × 50 ml.), dried over anhydrous magnesium sulphate, and evaporated to give an orange syrup. This syrup was dissolved in chloroform (100 ml.) and diluted with ether (150 ml.) to give the ester 1β-oxide (8.54g., 45 percent), m.p. 146°-148.5° $[\alpha]_D^{21} + 191°$ (c 0.97; $CHCl_3$).

METHOD (iii)

A suspension of sodium 6β-phenylacetamidopenicillanate (178.2 g., 0.5 mole) in p-methoxybenzyl chloride (94.0 g., 0.6 mole) and N,N-dimethylformamide (500 ml.) was stirred at room temperature for 88 hours. The reaction mixture was cooled in an ice-bath while peracetic acid (40 percent w/v; 100 ml., 0.525 mole) was added over 15 minutes, and then stirred at room temperature for a further 20 minutes. Slow dilution with water (1.2 liters) caused the separation of a white crystalline solid which was filtered off and washed with water (3 liters). The solid was then stirred for 5 minutes with ethanol (400 ml.), refiltered, washed with ethanol (100 ml.) and dried to give the ester 1$\beta$-oxide (213.5g., 91percent, m.p. 149° – 150°, $[\alpha]_D^{25}$ + 201° (C 0.94 ; CHCl$_3$).

p-Methoxybenzyl 6$\beta$-phenylacetamidopenicillanate 1$\beta$-oxide was converted into p-methoxybenzyl 3-methyl-7$\beta$-phenylacetamidoceph-3-em-4-carboxylate by one of the following methods:

a. A solution of p-methoxybenzyl 6$\beta$-phenylacetamidopenicillanate 1$\beta$-oxide (9.41g., 20 mmole.), pyridine (0.16g., 2 mmole.) and 89 percent phosphoric acid (0.22g., 2 mmole.) in dry peroxide-free dioxan (200 ml.) was heated under reflux for 15.25 hr., the condensed vapor being passed through molecular sieves (Linde 4A,1/16 inches; 40 g.) before returning to the reaction vessel. T.L.C. (benzene-ethyl acetate, 2:1) showed only a trace of starting 1$\beta$-oxide remaining on spraying with iodineazide reagent. The dioxan was removed at 30°/15mm. to give a brown gel which was triturated with I.M.S. (50 ml.). The resulting pale brown gel was collected, washed with I.M.S. and ether, and dried to give p-methoxybenzyl 3-methyl-7$\beta$-phenylacetamidoceph-3-em-4-carboxylate (6.025g., 66.5 percent, $[\alpha]_D$ + 44° (C, 1.24; CHCl$_3$), $\lambda_{max}$ (EtOH) 228 nm. ($E_{1cm}^{1\%}$ 355 ) and 264–274 nm. ($E_{1cm}^{1\%}$ 134), n.m.r. (CDCl$_3$) $\tau$7.92 (C$_3$–CHB3) integrated for 2.64 protons relative to $\tau$6.22 (C$_6$H$_4$ OCH$_3$). Evaporation of the combined filtrate and washings and crystallization from I.M.S. - ether gave a second crop of less pure ceph-3-em ester (0.69g., 7.6 percent), n.m.r. (CDCl$_3$) $\tau$7.92 integrated for 2.25 protons relative to $\tau$6.22.

b. Pyridine (320 mg., 4 mmole) and 89 percent phosphoric acid (220 mg., 2 mmole) were added to a solution of the ester 1$\beta$-oxide (9.41 g., 20 mmole) in dry, peroxide-free dioxan (200 ml.), and the mixture was heated under reflux for 16 hours so that the condensed vapors passed through a bed of molecular sieves (Linde 4A, 1/16 inches; 40 g.) before returning to the reaction vessel. T.l.c. (benzene-ethyl acetate; 1:1) followed by spraying with iodine-azide reagent showed that a trace of starting 1$\beta$-oxide was present, so the reaction mixture was heated under reflux for a further 4 hours. The dioxan was removed at 30°/15 mm. to give an orange solid which was crystallized from boiling methanol (300 ml.) to give p-methoxybenzyl 3-methyl-7$\beta$-phenylacetamidoceph-3-em-4-carboxylate as needles; they were filtered off, washed with ether (20 ml.) and dried (5.81 g., 64 percent), m.p. 151° –152°, $[\alpha]_D^{25}$ + 38.5° (c 1.00; CHCl$_3$), $\lambda_{max}$ (ethanol) 227 nm. ($E_{1cm}^{1\%}$ 382) and 269 nm. ($E_{1cm}^{1\%}$ 176). Evaporation of the filtrate and washings to ca. 100 ml. gave a second crop of ceph-3-em ester (0.98g., 11 percent), m.p. 150°–152°, $[\alpha]_D^{25}$ +38° (c 0.98; CHCl$_3$), $\lambda_{max}$ (ethanol) 226 nm. ($E_{1cm}^{1\%}$ 361.5) and 269 nm. ($E_{1cm}^{1\%}$ 162).

c. A reaction similar to that described in (b) but using pyridine (320 mg., 4 mmole) and monopyridyl dichloromethanephosphonate (488 mg., 2 mmole) gave, on removal of the dioxan, an orange gelatinous solid which was crystallized from boiling methanol (250 ml.) to give the ceph-3-em-ester as needles which were filtered off, washed with ether (20 ml.) and dried (6.08g., 67 percent, m.p. 151°–152.5°, $[\alpha]_D$+ 390 (c 1.08; CHCl$_3$), $\lambda_{max}$ (ethanol) 227 nm. ($E_{1cm}^{1\%}$ 392) and 269 nm. ($E_{1cm}^{1\%}$ 175). The filtrate and washings were evaporated to ca. 75 ml. when a gel began to separate. This was redissolved by heating to reflux; cooling gave a second crop of the ceph-3-em ester as needles (1.28 g., 14 percent, m.p. 149°–150.5°, $[\alpha]_D^{25}$ + 39° (c 0.98; CHCl$_3$), $\lambda_{max}$ (ethanol) 227 nm. ($E_{1cm}^{1\%}$ 164).

EXAMPLE 6 a. A solution of 6$\beta$-phenylacetamidopenicillanic acid 1$\beta$-oxide (7.02 g. 20 mmole.), phenacylbromide (4.02 g., 20 mmole.) and triethylamine (2.02 g., 20 mmole) in dry N,N-dimethylformamide (100 ml.) was stirred at room temperature for 1 hour, poured into water (700 ml.), and extracted with methylene dichloride (200 ml.). The combined organic extract was washed with water (4 × 350 ml.), dried over anhydrous magnesium sulphate and evaporated to give a yellow foam (8.81 g.), which was purified by chromatography on silica gel (340 g.) using benzene-ethyl acetate mixture as eluent. Benzene-ethyl acetate (1:1) eluted the phenacyl ester 1$\beta$-oxide as an off-white foam (6.17 g., 66 percent), $[\alpha]_D$ + 181° (c 1; CHCl$_3$), $\lambda_{max}$ (ethanol) 243 nm. ($\epsilon$ 11,850).

b. A solution of phenacyl 6$\beta$-phenylacetamidopenicillanate 1$\beta$-oxide (1.18g., 2.5 mmole.), pyridine (21 mg., 0.25 mmole.) and 89 percent phosphoric acid (28 mg., 0.25 mmole.) in dry, peroxide-free dioxan (50 ml.) was heated under reflux for 27 hr., the condensed vapor being passed through molecular sieves (linde 4A, 1/16 inches; 40 g.) before returning to the reaction vessel. T.L.C. (benzene-ethyl acetate, 3:1) showed only a trace of starting 1$\beta$-oxide remaining on spraying with iodine-azide reagent. The dioxan was removed at 30° / 15 mm. and the residual yellow solid was dissolved with warming in a mixture of ethyl acetate (100 ml.) and 2N-sulphuric acid (100 ml.). The organic layer was washed with water (100 ml.), combined with ethyl acetate back-wash of the aqueous layers, dried and evaporated to a crystalline solid. This solid was crystallized from I.M.S. to give phenacyl 3-methyl-7$\beta$-phenylacetamidoceph-3-em-4-carboxylate (0.56 g., 50 percent), m.p. 184°–190°, $[\alpha]_D$ + 12° (C 1.0; CHCl$_3$), $\lambda_{max}$ (ethanol) 244 nm. ($E_{1cm}^{1\%}$ 430 ) with inflexion at 270 nm. ($E_{1cm}^{1\%}$ 162).

A further crystallization from I.M.S. gave an analytical sample, m.p. 190–193°, $[\alpha]_D$ + 7° (C 1.0; CHCl$_3$), $\lambda_{max}$ (ethanol) 244 nm. ($\epsilon$ 19,800) with inflexion at 270 nm. ($\epsilon$ 7,480) (Found: C, 64.02; H, 5.0; N, 6.2; S, 7.0. C$_{24}$H$_{22}$N$_2$O$_5$S (450.5) requires C, 64.0; H, 4.9; N, 6.2; S, 7.1 percent).

EXAMPLE 7 a. p-Bromophenacyl bromide (3.2 g., 1 equiv.) was added in portions over 5 minutes to a stirred solution of 6β-phenylacetamidopenicillanic acid 1β-oxide (4.0 g.) and triethylamine (1.56 ml., 1 equiv.) in N,N-dimethylformamide (45 ml.). The reaction mixture was stirred at room temperature for 2.5 hours, poured into water (150 ml.) and extracted with ethyl acetate (2 × 75 ml.). The combined organic extract was washed repeatedly with water, dried, and evaporated and the residue was crystallized from ethyl acetate-ether to give the p-bromophenacyl ester 1β-oxide (5.32 g., 86.5 percent), m.p. 150°–153°, $[\alpha]_D + 161°$ (c 2.03; tetrahydrofuran), $\nu_{max}$ (CHBr$_3$) 1,800 (β-lactam) and 1,766 cm.$^{-1}$ (— CO$_2$R).

b. A solution of p-bromophenacyl 6β-phenylacetamidopenicillanate 1β-oxide (1.095g., 2 mmole.), pyridine (16 mg., 0.2 mmole.) and 89 percent phosphoric acid (22 mg., 0.2 mmole) in dry, peroxide-free dioxan (50 ml.) was heated under reflux for 30 hr., the condensed vapor being passed through molecular sieves (Linde 4A, 1/16 inches; 40g.) before returning to the reaction vessel. T.L.C. (benzene-ethyl acetate - 3:1) showed no starting 1β-oxide remaining on spraying with iodine-azide reagent. The dioxan was removed at 30°/15 mm. and the residue was dissolved with warming in a mixture of ethyl acetate (125 ml) and 2N-sulphuric acid (125 ml.). The organic layer was washed with water, combined with the ethyl acetate back-wash of the aqueous layers, dried and colorized by stirring with a mixture of anhydrous magnesium sulphate and charcoal, filtered and evaporated. The crystalline residue was recrystallized from hot I.M.S. to give p-bromophenacyl 3-methyl-7β-phenylacetamidoceph-3-em-4-carboxylate (0.50g., 47 percent), m.p. 194°–198° $[\alpha]_D + 8°$ (C 1.05; CHCl$_3$), $\lambda_{max}$ (ethanol) 258 nm. ($\epsilon$ 25,900).

A further crystallization from I.M.S. gave an analytical sample, m.p. 196°–199.5°, $[\alpha]_D + 9°$ (C 1.0; CHCl$_3$) (Found: C, 54.3; H, 4.1; Br, 14.9; N, 5.0; S, 5.8 C$_{24}$H$_{21}$BrN$_2$O$_5$S (529.4) requires C, 54.4; H, 4.0; H, 4.0; Br, 15.1; N, 5.3; S, 6.1 percent).

EXAMPLE 8

2,2,2-Trichloroethyl 7β-(N-t-butoxycarbonyl-D-α-aminophenylacetamido)-3-methylcepth-3-em-4-carboxylate was prepared via the following reaction scheme;

2,2,2-Trichloroethyl 6β-phenylacetamidopenicillanate

↓ a 2,2,2-Trichloroethyl 6β-aminopenicillanate hydrogen p-toluene sulphonate

↓ b 2,2,2-Trichloroethyl 6β-(N-t-butoxycarbonyl-D-α-aminophenylacetamido)penicillanate ↓ c 2,2,2-Trichloroethyl 6β-(N-t-butoxycarbonyl-D-α-aminophenylacetamido)penicillanate-1β-oxide ↓ d 2,2,2-Trichloroethyl 7β-(N-t-butoxycarbonyl-D-α-aminophenylacetamido)-3-methylceph-3-em-4-carboxylate a. 2,2,2-Trichloroethyl 6β-phenylacetamidopenicillanate (1.86 g., 4 mmole) and pyridine (1.36 ml.) in ethanol-free chloroform (15 ml.) at −2° was treated with phosphorus pentachloride (1.06 g., 5.2 mmole). The mixture was stirred at −2° until the cloudy precipitate which appeared after the addition had redissolved [usually about 30 min. ( a small amount of granular phosphorus pentachloride may still be present)], and methanol (10 ml.) was immediately added at such a rate that the temperature did not rise above 0°. The solution was stirred for 2.5 hr. at 0°, then poured into water (4 ml.) and the pH adjusted to 8.5 using sodium hydroxide and sodium carbonate. The organic phase was collected and combined with ethyl acetate extracts of the aqueous phase. The combined solution was dried (magnesium sulphate) and the solvent evaporated leaving a gum. This was dissolved in ethyl acetate (10 ml.), and treated with a solution of p-toluene sulphonic acid monohydrate (0.70 g., 3.7 mmole) in ethyl acetate (4 ml.). After 30 min., the precipitate was collected by filtration, giving 2,2,2-trichloroethyl 6β-amino-penicillanate hydrogen p-toluene sulphonate as a pale yellow powder (1.58 g., 78 percent), $[\alpha]_D^{20}$ +153.2° (C 0.43, water:dioxan = 1:9), $\nu_{max}$. (Nujol) 2,630 (NH$_3^+$), 1790 (β-lactam), 1,762 (CO$_2$CH$_2$CCl$_3$), 1,145 cm.$^{-1}$ (SO$_3^-$), $\tau$ (DMSO-d 6) 2.50, 2.87 [two 2-proton doublets (branches of a quartet), J8Hz; aromatic protons], 4.41 (1-proton doublet, J4Hz.; 6-H), 4.87 (1-proton doublet, J4Hz; 5-H), 4.96 (2-proton singlet; CO$_2$CH$_2$CCL$_3$), 5.35 (1-proton singlet; 3-H), 7.65 (3-proton singlet; CH$_3$-Ar), 8.24, 8.41 (two 3-proton singlets; 2-Me$_2$). [Found: C, 39.7; H, 4.1; N, 5.1; S, 12.3. C$_{17}$H$_{21}$Cl$_3$N$_2$O$_6$S$_2$ requires C, 39.3; H, 4.00; N, 5.4; S, 12.7 percent]

b. 2,2,2-Trichloroethyl 6 β-aminopenicillanate, hydrogen p-toluenesulphonate (2.60 g., 5.0 mmole) and sodium hydrogen carbonate (0.43 g., 5 mmole) were dissolved in methylene chloride (10 ml.) and water (10 ml.). The organic phase was collected and combined with further methylene chloride extracts (3 × 5 ml.) of the aqueous phase, the combined extracts washed with brine (20 ml.) and dried (magnesium sulphate). Dicyclohexylcarbodiimide (1.03 g., 5 mmole) was dissolved in this dried solution which was then treated with a solution of D-α-t-butoxycarbonylaminophenyl acetic acid (1.33 g., 5 mmole). The mixture was stirred for 4 hr., the precipitate of dicyclohexylurea filtered off, and the filtrate refrigerated overnight. Further dicyclohexylurea was removed and the volatile material evaporated, leaving a residue which was dissolved in ethyl acetate (50 ml.). The solution was washed with 2N-hydrochloric acid (2 × 20 ml.) water (20 ml.), 3 percent-sodium hydrogen carbonate (2 × 20 ml.) water (20 ml.) and brine (20 ml.), dried (magnesium sulphate), and the solvent evaporated, leaving 2,2,2-trichloroethyl 6β-(N-t-butoxycarbonyl-D-α-aminophenylacetamido) penicillanate as a pale yellow solid (2.55 g., 88 percent), $\nu_{max.}$ (bromoform) 1,788 ($\beta$-lactam), 1,770 ($CO_2CH_2CCl_3$), 1,710, 1,510 ($NHCO_2$ t.Bu). 1,698 and 1,500 cm.$^{-1}$ (CONH), $\tau$ ($CDCl_3$) 2.66 (5-proton singlet; phenyl protons), 3.28 (1-proton doublet, J8hz.; 7-NHCO), 4.37 (3-proton multiplet; $NHCO_2$, 5-H, 6-H), 4.80 (1- proton doublet, J 6.5 Hz.; PhCH), 5.23 (2-proton singlet; $CO_2CH_2CCl_3$), 5.48 (1-proton singlet; 3-H), 8.41, 8.49 (two 3- proton singlets; 2-$Me_2$), 8.60 (9- proton singlet; t-Bu).

c. Monoperphthalic acid (0.20 g., 1.1 mmole) in ether (0.79 ml) was added to a solution of 2,2,2-trichloroethyl 6$\beta$-(N-t- butoxycarbonyl-D-$\alpha$-aminophenylacetamido)penicillanate (0.58 g., 1 mmole) in methylene chloride (10 ml.) at 0°. The solution was allowed to reach room temperature, kept for 15 min., diluted with methylene chloride (40 ml.), and washed with 3 percent-sodium hydrogen carbonate (2 × 50 ml.) and water (2 × 50 ml.), dried (magnesium sulphate), and the solvent evaporated, leaving a syrup which was triturated under petrol (b.p. 40°–60°), giving 2,2,2-trichloroethyl 6$\beta$-(N-t-butoxycarbonyl-D-$\alpha$-aminophenylacetamido)penicillanate 1$\beta$-oxide as an off-white solid (0.31 g., 51 percent), $\nu_{max.}$ (bromoform) 1,800 ($\beta$-lactam), 1,768 ($CO_2CH_2CCl_3$), 1,710 ($NHCO_2$t.Bu) 1,695 and 1,515 cm.$^{-1}$ (CONH), $\tau$ ($CDCl_3$) 2.33 (1-proton doublet, J10 Hz; 7-NHCO), 2.64 (5-proton singlet; phenyl protons), 3.98 (1-proton double doublet, J 10, 4.5 Hz.; 6-H), 4.41 (1-proton doublet, J5.5 Hz.; $NHCO_2$), 4.87 (1-proton doublet, J5.5 Hz.; PhCH), 4.97, 5.33 [two 1-proton doublets (branches of a quartet), J 12 Hz.; $CO_2CH_2CCl_3$], 5.02 (1-proton doublet, J4.5 Hz.; 5-H), 5.22 (1-proton singlet; 3-H), 8.24, 8.72 (two 3-proton singlets, 2-$Me_2$), 8.57 (9-proton singlet; t.Bu).

d. 2,2,2-Trichloroethyl 6$\beta$-(N-t-butoxycarbonyl-D-$\alpha$-aminophenylacetamido) penicillanate 1$\beta$-oxide (270 mg., 0.45 mmole.) and pyridinium phosphate ($C_5H_5N \cdot 2H_3PO_4$; 9mg., 0.033 mmole.). in dry dioxan (3ml.) was heated under reflux for 16 hr. The solvent was evaporated, the residue dissolved in ethyl acetate (20 ml.), the solution washed with water, dried, and the ethyl acetate evaporated leaving a glass which was triturated under petrol (b.p. 40°–60°) giving 2,2,2-trichloroethyl 7$\beta$-(N-t-butoxycarbonyl-D-$\alpha$-aminophenylacetamido)-3-methylceph-3-em-4-carboxylate as an off-white powder (264 mg.). Although thin-layer chromatography (Merck silicagel, acetone: methylene chloride = 3:97 as developing solvent) showed a single spot, $R_f$ 0.39, the proton magnetic resonance spectrum indicated a purity of ca. 50 percent. the remaining 50 percent was a mixture of products.

EXAMPLE 9

2,2,2-Trichloroethyl 6$\beta$-(N-trichloroethyloxycarbonyl-D-$\alpha$-aminophenylacetamido)pencillanate 1$\beta$-oxide (328 mg., 0.45 mmole.) and pyridinium phosphate ($C_5H_5N \cdot 2H_3PO_4$; 9mg., 0.033 mmole.) in dry dioxan (3ml.) was heated under reflux for 16 hr. The solvent was evaporated, the residue dissolved in ethyl acetate (20 ml.), the solution washed with water, dried, and the ethyl acetate evaporated leaving a glass which was triturated under petrol (b.p. 40°–60°) giving 2,2,2-trichloroethyl 7$\beta$-(N-trichloroethyl-oxycarbonyl-D-$\alpha$-aminophenylacetamido)-3-methylceph-3-em-4-carboxylate as an off-white powder (294 mg.). Although thin-layer chromatography (system as above) showed a single spot, $R_F$ 0.72, the proton magnetic resonance spectrum indicated a purity of ca. 30 percent, the remaining 70 percent being a mixture of products.

EXAMPLE 10

2,2,2-Trichloroethyl 6$\beta$-phenylacetamidopenicillanate 1$\beta$-oxide (4.82 g., 10 mmole.), N-methylaniline (0.107 g. 1 mmole.) and orthophosphoric acid (Specific gravity 1.75; 0.112 g., 1 mmole.), were added to isobutylmethyl ketone (200 ml.) and the mixture was boiled under reflux for 1.25 hr. N-methyl-aniline (0.107 g., 1 mmole.) and orthophosphoric acid (Specific gravity 1.75; 0.112 g. 1 mmole.) were added and boiling was continued for a further 2.75 hr.

The solution was cooled to room temperature and washed with water (1 × 100 ml., 1 × 50). The organic layer was evaporated to dryness and the semi-solid residue was dissolved in ethyl alcohol (I.M.S.; 20 ml.). The alcoholic solution was similarly evaporated and trituration of the residue with ethyl alcohol (I.M.S.; 15 ml.) produced a crystalline solid. The mixture was stored at 0°C for 16 hr. The product was collected by filtration, washed with diethyl ether and dried to yield 2,2,2-trichloroethyl 3-methyl 7$\beta$-phenylacetamidoceph-3-em-4-carboxylate (1.90 g., 41.0 percent of theory), m.p. 161–2°, $[\alpha]_D^{20}$ + 51.0° (C, 1.0 in $CHCl_3$).

EXAMPLE 11

2,2,2-Trichloroethyl 6$\beta$-phenylacetamidopenicillanate 1$\beta$-oxide (14.46 g., 0.03 mole) in dioxan (300 ml.) was treated with m-nitrobenzenephosphonic acid (0.609 g.) and pyridine (0.24 ml.) and the solution refluxed for 16 hours. During the reflux the condensate was passed through neutral alumina before returning to the reaction flask. The reaction mixture was concentrated in vacuo. The residue was triturated with hot I.M.S. (30 ml.), cooled to room temperature and refrigerated for 2 hours. The solid was collected by filtration washed with I.M.S. (10 ml.) and diethyl ether (20 ml.) and dried at 40° in vacuo to give 2,2,2-trichloroethyl 3-methyl-7$\beta$-phenylacetamidoceph-3-em-4-carboxylate (11.32 g., 81.4 percent of theory) as a white crystalline solid m.pt. 160–2°; $[\alpha]_D$ + 52.8 (C = 0.9 in $CHCl_3$), $\lambda_{max.}$ (ethanol) at 264 nm ($E_{1cm.}^{1\%}$ 136.5).

Concentration of the mother liquors followed by crystallization at 0° afforded a second crop (0.6 g., 4.3 percent) m.pt. 160–2°$[\alpha]_D$ + 52 (C = 0.8 in $CHCl_3$).

EXAMPLES 12 – 65

Using a variety of solvents and catalysts 2,2,2-trichloroethyl 6$\beta$-phenylacetamidopenicillanate 1$\beta$-oxide was converted into 2,2,2-trichloroethyl 3-methyl 7$\beta$-phenylacetamidoceph-3-em-4-carboxylate under the conditions and in the yields summarized in Table 1.

TABLE I

| Example Number | Catalyst Base | Catalyst Acid | Mol. equiv. | Solvent (at b.p.) | Concn. of pen. oxide, percent | Time, hrs. | Yield as percent of theory |
|---|---|---|---|---|---|---|---|
| 12 | Pyridine | Phosphoric acid [1] | 0.1 | Diglyme | 5 | 0.33 | 45.3 |
| 13 | do | do | 0.05 | i-Pr. propionate | 5 | 6 | 60.2 |
| 14 | do | do | 0.2 | n-Butyl acetate | 5 | 6 | 49.2 |
| 15 | do | do | [2] 0.025 | do | 5 | 1.75 | 64.9 |
| 16 | do | Methane sulphonic acid (1) | 0.05 | do | 5.0 | 1.5 | 47.5 |
| 17 | do | Phosphorous acid | 0.1 | Isobutyl methyl ketone | 2.5 | 5 | 48.4 |
| 18 | do | Phosphorous acid | 2×0.125 | n-Butyl acetate | 5.0 | 6.5 | 41.4 |
| 19 | do | p-Toluene sulphonic acid | 0.1 | Isobutyl methyl ketone | 2.5 | 1.5 | 48.4 |
| 20 | do | p-Xylene sulfonic acid | 0.1 | do | 2.5 | 4 | 48.7 |
| 21 | do | Pyrophosphoric acid (1) | 0.1 | do | 2.5 | 5 | 41.4 |
| 22 | do | Trifluoro acetic acid | 0.1 | do | 2.5 | 8 | [3] 40 |
| 23 | Aniline | Phosphoric acid | 0.1 | do | 2.5 | 3.75 | 44.3 |
| 24 | o-Chloroaniline | do | 0.1 | do | 2.5 | 4.0 | 38.8 |
| 25 | m-Chloroaniline | do | 0.1 | do | 2.5 | 3.5 | 41.8 |
| 26 | p-Chloroaniline | do | 0.1 | do | 2.5 | 3.25 | 42.5 |
| 27 | o-Methyl aniline | do | 0.1 | do | 2.5 | 3.5 | 45.6 |
| 28 | m-Methyl aniline | do | 0.1 | do | 2.5 | 3.5 | 44.2 |
| 29 | o-Methoxy aniline | do | 0.1 | do | 2.5 | 3.5 | 45.6 |
| 30 | m-Nitro aniline | do | 0.1 | do | 2.5 | 3.5 | 44.3 |
| 31 | m-Carboxy aniline | do | 0.1 | do | 2.5 | 4.5 | 40.0 |
| 32 | m-Hydroxy aniline | do | 0.1 | do | 2.5 | 4.75 | 40.2 |
| 33 | Pyridine | Naphthalene-2-sulphonic acid | 0.1 | do | 2.5 | 4 | 37.7 |
| 34 | do | Trifluoro acetic acid | 0.1 | Dioxan | 2.5 | 24 | 49 |
| 35 | 3-bromo pyridine | Phosphoric acid [1] | 0.1 | Isobutyl methyl ketone | 2.5 | 3.5 | 48.1 |
| 36 | Benzimidazole | Phosphoric acid | 0.1 | do | 2.5 | 2.0 | 54.3 |
| 37 | 2-methyl quinoline | do | 0.1 | do | 2.5 | 6.5 | 43.3 |
| 38 | Isoquinoline | Phosphoric acid [1] | 0.1 | do | 2.5 | 2.75 | 68.2 |
| 39 | 3-methyl pyridine | do | 0.1 | do | 2.5 | 2.3 | 63.1 |
| 40 | 4-methyl pyridine | do | 0.1 | do | 2.5 | 2.3 | 68.5 |
| 41 | 2-methyl pyridine | do | 0.1 | do | 2.5 | 6.3 | 47.8 |
| 42 | 2-formyl pyridine | Phosphoric acid [1] | 0.1 | do | 2.5 | 3.75 | 43.2 |
| 43 | Sulphaniline | do | 0.1 | do | 2.5 | 3 | 38.8 |
| 44 | 3-acetamido pyridine | do | 0.1 | do | 2.5 | 3.25 | 66.4 |
| 45 | 3-acetyl pyridine | do | 0.1 | do | 2.5 | 2.5 | 55.8 |
| 46 | 4-acetamido pyridine | do | 0.1 | do | 2.5 | 10.5 | 32.2 |
| 47 | 4-chloro pyridine | Phosphoric acid | 0.1 | do | 2.5 | 2.5 | 49.2 |
| 48 | 4-aldoximino pyridine | Phosphoric acid [1] | 0.1 | do | 2.5 | 2.5 | 65.6 |
| 49 | 4-carboxy pyridine | Phosphoric acid | 0.1 | do | 2.5 | 5 | 56.3 |
| 50 | 4-cyano pyridine | Phosphoric acid [1] | 0.1 | do | 2.5 | 3.5 | 43.4 |
| 51 | 3-formyl pyridine | do | 0.1 | do | 2.5 | 3.5 | 52.8 |
| 52 | Quinoline | do | 0.1 | do | 2.5 | 3.75 | 56.8 |
| 53 | 4-methyl quinoline | Phosphoric acid | 0.1 | do | 2.5 | 7.25 | 55.2 |
| 54 | 8-hydroxy quinoline | Phosphoric acid [1] | 0.1 | do | 2.5 | 4.0 | 44.2 |
| 55 | 2-chloro pyridine | do | 0.1 | do | 2.5 | 4.0 | 44.3 |
| 56 | Pyridine | Methane phosphonic acid | 0.3 | Dioxan | 5 | 16 | 42.7 |
| 57 | do | Ethane phosphonic acid | 0.3 | do | 5 | 22.5 | 46.8 |
| 58 | do | Iodomethane phosphonic acid | 0.1 | do | 5 | 17 | 67.6 |
| 59 | do | Trichloro methane phosohonic acid | 0.05 | do | 5 | 18.5 | 60.6 |
| 60 | Dipyridine | do | 0.05 | do | 5 | 16 | 71 |
| 61 | N-methyl aniline | do | 0.1 | do | 5 | 16.5 | 39.2 |
| 62 | Bis (benzyl amine) | do | 0.05 | do | 5 | 16 | 52.1 |
| 63 | α-Picoline | do | 0.075 | do | 5 | 24 | 51 |
| 64 | Pyridine | o-Bromo benzene phosphonic acid | 0.1 | do | 5 | 18 | 52 |
| 65 | do | Phosphonic acid | 0.05 | do | ~20 | 11 | 76.5 |

[1] Base salts not isolated.
[2] An additional 0.025 mol. equivalent of free phosphoric acid used.
[3] Estimated from crude yield of 51.6%.

EXAMPLE 66 a. A mixture of aluminum chloride (268 g.; 2.0 mol.), phosphorus trichloride (88 ml. 1.0 mol.), and chloroform (160 ml. 2.0 mol.) was boiled under reflux for 2 hours. The solution was cooled and poured into methylene chloride (700 ml.), the vessel was washed with methylene chloride (2 × 150 ml.) and the washes added to the main solution. The mixture was cooled to −20° and stirred vigorously while water (260 ml.; 14.4 mol.) was added at such a rate as to keep the temperature near −5°. When addition was complete the mixture was warmed to 18° and stirred a further 30 minutes. The precipitated aluminum trichloride hexahydrate was filtered off and the bed washed with methylene chloride (1 × 500 ml.; 2 × 250 ml). Water (40 ml; 2.2 mol.) was added to the methylene chloride solution and the mixture refluxed for 1 hour to complete the second stage of the hydrolysis. The methylene chloride was distilled off and the residue was treated with methylene chloride (250 ml.) which was again distilled off. The residual oil was then kept under reduced pressure (water-pump) for 15 minutes to remove dissolved HCl. The oil was dissolved in acetone (500 ml.), cooled to 0° and stirred while pyridine (63 ml.) was added dropwise. The solid was filtered off and washed with cold acetone (3 × 50 ml) and dried at room temperature in vacuo overnight to give crude monopyridinium dichloromethanephosphonate (197.4 g.; 80.4 percent) m.p. 141–2°.

The crude salt was dissolved with stirring in boiling I.M.S. (410 ml.), cooled until crystallization commenced, then refrigerated for 3 hours. The product was collected and washed with acetone (3 × 50 ml.) and dried at 40° in vacuo to give monopyridinium dichloromethanephosphonate (188.6 g.; 77.3 percent theory overall) m.p. 143 – 5°. Free from ionizable chloride (no turbidity with silver nitrate in nitric acid).. Found: C, 29.9; H, 3.3; Cl, 29.1; N, 5.9; P, 12.3; $C_6H_8Cl_2NO_3P$ requires C, 29.5; H, 3.3; Cl, 29.1; N, 5.7; P, 12.7 percent.

b. 2,2,2-Trichloroethyl 6β-phenylacetamidopenicillanate 1β-oxide (96.4 g; 0.2 mole) and monopyridinium dichloromethane phosphonate (1.95 g; 0.008 moles) were added to dioxan (482 ml; treated with basic alumina) in a 3-necked flask, fitted with a stirrer and condenser. The mixture was stirred and brought to reflux, with the condensed vapors being returned through sodium hydroxide pellets. The solution was stirred under reflux for a total of 8 hours when no starting material remained (TLC). The dioxan was removed under reduced pressure to leave a moist solid. IMS (200 ml.) was added and the solid triturated for several minutes to give a uniformly crystalline material. The mixture was left at 0° for 3 hours, when the solid was collected by filtration, washed with IMS (100 ml.),ether (100 ml.) and dried in vacuo at room temperature to give 2,2,2-trichloroethyl 3-methyl-7β-phenylacetamidoceph-3-em-4-carboxylate (75.1 g: 80.9percent theory yield) as a white crystalline solid, m.p. 162–165° corrected, $[\alpha]_D + 53°$(c, 0.91 in CHCl$_3$), $\lambda_{max}^{EtOH}$ 264 nm ($E_{1cm}^{1\%}$ = 130), TLC (benzene/ethyl acetate, 2:1): single spot R$_f$ 0.65.

The liquors were concentrated to give a second crop of the above product (2.3 g.; 2.5 percent theory yield).

dried in vacuo at room temperature to give 2,2,2-trichloroethyl 3-methyl-7β-phenylacetamido-ceph-3-em-4-carboxylate (89.6 g.; 96.6 percent theory), m.p. 156°(corrected); $[\alpha]_D + 58°$ (CHCl$_3$); $\lambda_{max}$. (ethanol) 264 nm ($E_{1cm}^{1\%}$ 121).

EXAMPLE 69

Preparation of salts of phosphonic acids

A 12.5percent solution of the acid in the appropriate solvent was treated with the base, added dropwise, until no further precipitation occurred. The solid was filtered off, washed with the same solvent as used for the reaction and dried in vacuo at 20° to give the required product. Samples were recrystallized if necessary.

The following table gives the salts of the acid RP(O)(OH)$_2$ which were prepared in this manner. All the acids shown in the table formed the mono-basic salt with the exception of trichloromethane phosphonic acid which gave the dibasic salt with benzylamine.

| | | | Salt | | | | | | | |
|---|---|---|---|---|---|---|---|---|---|---|
| | | | M.P. (corr.) degrees | Found | | | | Required | | |
| Acid R= | Base | Solvent | | C | H | Cl | N | C | H | Cl | N | Formula |
| Cl$_3$C— | N-Methylaniline | Ether | 219–20 | 31.6 | 3.6 | 34.7 | | 31.3 | 3.6 | 34.7 | | C$_8$H$_{11}$NO$_3$Cl$_3$P |
| Cl$_3$C— | Pyridine | do | 180–4 | 25.9 | 2.9 | 38.8 | 5.1 | 25.9 | 2.5 | 38.2 | 5.0 | C$_8$H$_7$NO$_3$Cl$_3$P |
| Cl$_3$C— | Benzylamine | do | 198–202 | 43.8 | 5.1 | 25.6 | 6.5 | 43.5 | 4.9 | 25.7 | 6.8 | C$_{15}$H$_{20}$N$_2$O$_3$Cl$_3$P |
| Cl$_3$C— | α-Picoline | do | 155–7 | 28.3 | 3.0 | 36.5 | 4.7 | 28.7 | 3.1 | 36.4 | 4.8 | C$_7$H$_9$NO$_3$Cl$_3$P |
| Cl$_2$CH— | Isoquinoline | Acetone | 143–7 | 40.5 | 3.3 | 24.0 | 4.4 | 40.8 | 3.4 | 24.2 | 4.8 | C$_{10}$H$_{10}$NO$_3$Cl$_2$P |
| Cl$_2$CH— | 3-methylisoquinoline | do | 147–9 | 42.4 | 4.0 | 23.1 | 4.3 | 42.8 | 3.9 | 23.1 | 4.6 | C$_{11}$H$_{12}$NO$_3$Cl$_2$P | m.p. 159° – 162° corrected, $[\alpha]_D + 53.1°$ (c, 0.97 in CHCl$_3$), $\lambda_{max}^{EtOH}$ 264 nm ($E_{1cm}^{1\%}$ = 131), TLC (benzene/ethyl acetate, 2:1): single spot R$_f$ 0.65.

EXAMPLE 67

2,2,2-Trichloroethyl 6β-phenylacetamidopenicillanate 1β-oxide (96.4 g; 0.2 mole), monopyridinium dichloromethanephosphonate (1.708 g; 0.007 mole) and pyridine (0.56 ml; 0.007 mole) were added to dioxan (482 ml; treated with basic alumina) in a three necked flask fitted with a stirrer and condenser. The reaction and isolation of the product were carried out as described in Example 66(b) to give 2,2,2-trichloroethyl 3-methyl-7β-phenylacetamidoceph-3-em-4-carboxylate (73.5 g; 79.2 percent theory yield) as a white crystalline solid, m.p. 161.5°–164.5° corrected, $[\alpha]_D + 53.9$ (c 0.91 in CHCl$_3$) $\lambda_{max}^{EtOH}$ 264 nm ($E_{1cm}^{1\%}$ + 131), T.L.C. (benzene/ethyl acetate 2:1) single spot R$_f$ 0.65.

A second crop (2.74 g; 2.95 percent theory yield) m.p. 160° – 162° corrected; $[\alpha]_D + 53.6°$ (C 0.95 in CHCl$_3$) $\lambda_{max}^{EtOH}$ 264 ($E_{1cm}^{1\%}$ = 131), T.L.C. 1 spot, was obtained from the mother liquors.

EXAMPLE 68

2,2,2-Trichloroethyl 6β-phenylacetamidopenicillanate 1β-oxide (96.4 g.; 0.2 mole) and monopyridinium dichloromethane phosphonate (1.95 g.; 0.008 mole) were boiled under reflux in dry peroxide-free dioxan (482 ml.) and the condensate was run through a column of desiccant (sodium hydroxide pellets: 200 g.) before being returned to the reaction flask. The progress of the reaction was followed by TLC. After 7.5 hours reflux no starting material remained. The solution was cooled to room temperature and poured into water (2.5 liters) with stirring. The solid was isolated by filtration, washed with water (2 × 100 ml.) and

EXAMPLE 70

2,2,2-Trichloroethyl 6β-phenylacetamidopenicillanate 1β-oxide (48.2 g., 0.1 mole) and monoisoquinolinium dichloromethanephosphonate (1.471 g.; 0.005 m.) in dioxan (482 ml.) were reacted (8 hours) and the product was isolated as described in example 66(b) to give 2,2,2-trichloroethyl 3-methyl-7β-phenylacetamidoceph-3-em-4-carboxylate (37.02 g., 79.6 percent theory yield). m.p. 162–4° C corrected, $[\alpha]_D$ +52.1° (c, 0.8 in CHCl$_3$), $\lambda_{max}^{EtOH}$ 264 nm ($E_{1cm}^{1\%}$ 140).

The liquors were concentrated to give a second crop of similar material (1.08 g., 2.6 percent theory yield), m.p. 159–61°C, $[\alpha]_D$ +52.4°.

EXAMPLE 71

2,2,2-Trichloroethyl 6β-phenylacetamidopenicillanate 1β-oxide (48.2 g., 0.1 m.) and mono-3-methylisoquinolinium dichloromethanephosphonate (1.54 g., 0.005 m.) in dioxan (482 ml.) were reacted (81.25 hours) and the product was isolated as described in example 66(b) to give 2,2,2-trichloroethyl 3-methyl-7β3-em-4-carboxylate (30.42 g.: 65.5 percent theory yield, m.p. 162–4° C corrected, $[\alpha]_D + 52°$ (c, 0.8 in CHCl$_3$), $\lambda_{max}^{EtOH}$ 264 nm ($E_{1cm}^{1\%}$ 138).

EXAMPLE 72

2,2,2-Trichloroethyl 3-methyl-7β-phenoxyacetamidoceph-3-em-4-carboxylate

A solution of 2,2,2-trichloroethyl 6β-phenoxyacetamidopenicillanate-1β-oxide (2.45 g; 5.0 m.mole) in dioxan (dried by passage through basic alumina, 50 ml.) was brought to reflux such that the condensed vapors were passed through molecular sieves (Linde 4A; 30g) before being returned to the reaction flask. The mixture was heated at reflux for 20 minutes and then dichloromethanephosphonic acid monopyridinium salt (0.1345 g; 0.52 m.mole; 0.104 eq) and pyridine (0.0391g; 0.50 m.mole; 0.100 eq) were added. The refluxing was continued for 5½ hours after which time all the starting material had been consumed (as determined by T.L.C. using 2 percent acetone in methylene chloride as eluent, and potassium iodide-iodine-potassium azide solution as detecting spray reagent). The dioxan was removed under reduced pressure and the residual yellow oil dissolved in ethanol (5ml) and ether (5ml). Evaporation of this solution to dryness left a pale yellow solid which upon trituration with ether (10 ml) containing methanol (0.5 ml) yielded the title compound as a buff-colored solid (1.45g; 60.5 percent) m.p. 112°–115° (uncorr.); $[\alpha]_D^{24}$ + 57.2° (c, 1.19, CHCl$_3$). Evaporation of the mother liquors and re-trituration with ether (2 ml.) containing methanol (0.1 ml) gave a second crop as a buff-colored solid (0.436 g; 18.6 percent) m.p. 105°–114° (uncorr.) $[\alpha]_D^{24}$ + 53.4° (c. 1.20, CHCl$_3$)

EXAMPLE 73 a. t-Butyl 6β-Phenylacetamidopenicillanate-1β-oxide

To a solution of 6β-phenylacetamidopenicillanic acid 1β-oxide (3.5 g; 0.01 mole) and pyridine (4.2 ml, 0.05 mole) in t-butanol (10 ml.) at 0°, phosgene (2 ml., 0.028 mole) was added over 20 min., such that the temperature did not exceed 8°. 5 Min. after the addition was complete, the cooling bath was replaced by a bath at 23° and stirring continued for 30 min. The mixture was poured into sodium carbonate solution (75 ml., containing enough alkali to give a final pH of 9), and extracted with ethyl acetate (3×50 ml.). The combined organic extract was washed with water (50 ml.) and brine (50 ml.), dried (magnesium sulphate), and the solvent evaporated leaving a brown crystalline residue (1.95 g.). Treatment of this residue with ether (25 ml.) for 30 min. gave t-butyl 6β-phenylacetamidopenicillanate-1β-oxide as a fawn powder (1.20 g, 29 percent), m.p. 147°–149°, $[\alpha]_D^{20}$ + 201° (c 1.00, dioxan), R$_F$ 053 (Merck silica gel-coated plates; benzene:ethyl acetate = 1:1 as developing solvent), $\lambda_{max}$ (CHBr$_3$) 3,390 (NH), 1790 (β-lactam), 1,738 (CO$_2$t.Bu), 1,678, 1,502 (CONH), 1,028 cm$^{-1}$ (S=O), τ (CDCl$_3$) 2.69 (5-proton singlet; phenyl protons), 2.89 (1-proton doublet, J 10 Hz; CONH), 3.99 (1-proton double doublet, J 5, 10 Hz C-6H), 5.04 (1-proton doublet, J 4.5 Hz; C-5H), 5.47 (1-proton singlet; C-3 H), 6.42 (2-proton singlet; CH$_2$CON), 8.33, 8.77 [two 3-proton singlets; C-2 (CH$_3$)$_2$], 8.51 (9-proton singlet; t-Bu).

A further amount (0.6 g., 15%) of crude ester was obtained by concentration of the mother liquor.

b. t-Butyl 3-Methyl-7β-phenylacetamidoceph-3-em-4-carboxylate

A solution of t-butyl-6β-phenylacetamidopenicillanate-1β-oxide (9.28 g, 22.9 m.mole) and dipyridinium dichloromethylphosphonate (0.729 g, 2.65 m.mole) in dry dioxan (180 mls) was refluxed for 7 hours, the refluxing dioxan being passed through a bed of molecular sieves (Linde type 4A). The solution was evaporated to dryness under reduced pressure, the residue dissolved in dichloromethane (200 mls), washed with a saturated aqueous sodium bicarbonate solution (50 ml.), water (50 mls) dried (Na$_2$SO$_4$) and evaporated to dryness under reduced pressure to give a gelatinous solid (9.83 g). This solid was stirred with ether (60 mls) for 6 hours at 25°, stood at 4° for 62 hours and filtered; the residue was washed with ether (30 mls) and dried to give t-butyl 3-methyl-7β-phenylacetamidoceph-3-em-4-carboxylate (5.80 g, 15.0 m.moles 65.5 percent), m.p. 120–123°, $[\alpha]_D$ + 62° (c1.00, CHCl$_3$) $\nu$ (CHBr$_3$) 3,430 and 3,345 (NH), 1,780 (β-lactam), 1,720 (CO$_2$R), 1,680 and 1,510 cm$^{-1}$ (CONH), (CDCl$_3$, 100 MH$_2$) 8.46 (9-proton singlet; t-butyl), 7.93 (3-proton singlet; 3-methyl), 6.53 and 6.91 (2-proton AB-quartet, J=18 Hz; S-CH$_2$-), 6.40 (2-proton singlet; Ph CH$_2$-), 5.11 (1-proton doublet J = 47 Hz; 6-H): 4.29 (1-proton doublet of doublets, J = 9 and 4 Hz; 7-H), 3.32 (1-proton doublet, J = 9 Hz; N-H), 2.73 (5-proton singlet; Ph-), $\lambda_{max}$ (ε) 257.5 (5.780) and 263.5 (5.780) (Found : C, 59.9; H, 6.2; N, 6.8 S, 7,9 C$_{20}$H$_{24}$N$_2$O$_4$S requires C. 61.8; H, 6.2; N, 7.2 S, 8.2%%).

We claim:

1. In a process for the preparation of a 7β-acylamido-3-methylceph-3em-4-carboxylic acid ester by heating a 6β-acylamidopenicillanic acid 1-oxide ester in a substantially inert organic solvent in the presence of a catalyst, the improvement which comprises employing as catalyst a salt of an amine selected from the group consisting of pyridine; quinoline; isoquinoline; benzimidazole; pyridine, quinoline, isoquinoline or benzimidazole substituted by a chlorine or bromine atom or a lower alkyl, formyl acetyl, acetamido, cyano, carboxy or aldoximino group; aniline aniline substituted by a chlorine atom or a lower alkyl, hydroxy, lower alkoxy, nitro or carboxy group; and N-lower alkyl aniline and bis (benzylamine) and an acid selected from the group consisting of methane sulphonic acid, toluene-p-sulphonic acid, p-xylene sulphonic acid, pyridyl sulphonic acid, a phosphorus acid and trifluoroacetic acid.

2. A process as defined in claim 1 wherein said catalyst is a salt of an acid selected from the group consisting of methane sulphonic acid, toluene-p-sulphonic acid, p-xylene sulphonic acid, naphthalene-2-sulphonic acid and pyridyl sulphonic acid.

3. A process as defined in claim 1 wherein said catalyst is a salt of orthophosphoric acid.

4. A process as defined in claim 1 wherein said catalyst is a salt of an acid selected from the group consisting of a lower alkyl phosphonic acid an a chloro-, bromo- or iodo- substituted lower alkyl phosphonic acid.

5. A process as defined in claim 1 wherein said catalyst is a salt of an acid selected from the group consisting of methane phosphonic acid, ethane phosphonic acid, trichloromethane phosphonic acid, iodomethane phosphonic acid and dichloromethane phosphonic acid.

6. A process as defined in claim 1 wherein said catalyst is a salt of an acid selected from the group consisting of benzene phosphonic acid, a chloro-, bromo- or iodo-benzene phosphonic acid and a mitro-benzene phosphonic acid.

7. A process as defined in claim 1 wherein said catalyst is a salt of an unsaturated heterocyclic tertiary base selected from the group consisting of pyridine, quinoline, isoquinoline, benzimidazole and pyridine, quinoline, isoquinoline or benzimidazole substituted by a lower alkyl group.

8. A process as defined in claim 1 wherein said catalyst is a salt of a member selected from the group consisting of aniline, a chloroaniline, a lower alkyl aniline, a hydroxy aniline, a lower alkoxy aniline, a nitroaniline, a carboxyaniline and a N-lower alkyl aniline.

9. A process as defined in claim 1 wherein said salt is obtained by the reaction of substantially molar equivalents of an acid selected from the group consisting of a phosphorus acid, methane sulphonic acid, toluene p-sulphonic acid, p-xylene sulphonic acid and pyridine sulphonic acid with said amine.

10. A process as defined in claim 1 wherein said salt is formed from an amine selected from the group consisting of pyridine; 2-methyl-, 3-methyl- and 4-methyl-pyridines; quinoline and isoquinoline and an acid selected from the group consisting of orthophosphoric, methane phosphonic, ethane phosphonic, iodomethane phosphonic, dichloromethane phosphonic, trichloromethane phosphonic, bromobenzene phosphonic and nitrobenzene phosphonic acids.

11. A process as defined in claim 1 wherein said salt is obtained in situ by the reaction of substantially molar equivalents of pyridine and orthophosphoric acid.

12. A process as defined in claim 1 wherein said salt is obtained by the reaction of substantially molar equivalents of pyridine and dichloromethane phosphonic acid.

13. A process as defined in claim 1 wherein said salt is obtained by the reaction of about two molar equivalents of pyridine and one molar equivalent of dichloromethane phosphonic acid.

14. A process as defined in claim 1 in which a proportion of said salt not exceeding 1.0 mole per mole of penicillin oxide is used.

15. A process as defined in claim 14 wherein the proportion of said salt is from 0.01 to 0.2 mole per mole of penicillin oxide.

16. A process as defined in claim 1 wherein the organic solvent is dioxan.

17. A process as defined in claim 1 wherein said solvent selected from the group consisting of ethyl methyl ketone, iso-butyl methyl ketone, methyl n-propyl ketone, n-propyl acetate, n-butyl acetate, iso-butyl acetate, sec-butyl acetate, diethyl carbonate and diethylene glycol dimethyl ether.

18. A process as defined in claim 1 in which the reaction is effected at the boiling point of the solvent and wherein a desiccating agent, which is inert under the reaction conditions, is inserted in a reflux return line to remove water formed during the reaction.

* * * * *